US009641869B2

(12) United States Patent
Laksono et al.

(10) Patent No.: US 9,641,869 B2
(45) Date of Patent: May 2, 2017

(54) VIDEO CAMERA SYSTEM WITH DISTRIBUTED CONTROL AND METHODS FOR USE THEREWITH

(71) Applicant: ViXS Systems, Inc., Toronto (CA)

(72) Inventors: Indra Laksono, Richmond Hill (CA); Sally Jean Daub, Toronto (CA); John Pomeroy, Markham (CA); Xu Gang Zhao, Maple (CA)

(73) Assignee: ViXS Systems, Inc., Toronto (CA)

( * ) Notice: Subject to any disclaimer, the term of this patent is extended or adjusted under 35 U.S.C. 154(b) by 0 days.

(21) Appl. No.: 14/677,024

(22) Filed: Apr. 2, 2015

(65) Prior Publication Data

US 2016/0295246 A1 Oct. 6, 2016

(51) Int. Cl.
*H04N 21/454* (2011.01)
*H04N 21/218* (2011.01)
*H04N 21/2187* (2011.01)
*H04N 21/254* (2011.01)
*H04N 21/258* (2011.01)
*H04N 21/472* (2011.01)
*G05D 1/00* (2006.01)
*H04N 5/247* (2006.01)
*H04N 5/268* (2006.01)

(52) U.S. Cl.
CPC ......... *H04N 21/21805* (2013.01); *G05D 1/00* (2013.01); *H04N 5/247* (2013.01); *H04N 5/268* (2013.01); *H04N 21/2187* (2013.01); *H04N 21/2541* (2013.01); *H04N 21/25816* (2013.01); *H04N 21/47202* (2013.01)

(58) Field of Classification Search
CPC combination set(s) only.
See application file for complete search history.

(56) References Cited

U.S. PATENT DOCUMENTS

| 8,719,872 B2 * | 5/2014 | Bountour | H04N 7/181 |
| | | | 725/105 |
| 2002/0069265 A1 * | 6/2002 | Bountour | H04N 7/181 |
| | | | 709/219 |
| 2015/0067746 A1 * | 3/2015 | Willis | H04N 21/2353 |
| | | | 725/109 |

* cited by examiner

*Primary Examiner* — Kieu Oanh T Bui
(74) *Attorney, Agent, or Firm* — Garlick & Markison; Bruce E. Stuckman

(57) ABSTRACT

Aspects of the subject disclosure may include, for example, a video camera system that includes a first subset of video cameras that are configured to generate at least one broadcast video signal of an event, and a second subset of video cameras that are each individually controllable in response to subscriber control data from a corresponding one of a plurality of video player systems to generate a plurality of processed video signals of the event. A video access server receives the subscriber control data from the video player systems corresponding to a plurality of subscribers for control of the second subset of video cameras, and for routing the processed video signals of the event such that each of the plurality of processed video signals of the event is routed to the corresponding one of the plurality of video player systems. Other embodiments are disclosed.

16 Claims, 8 Drawing Sheets

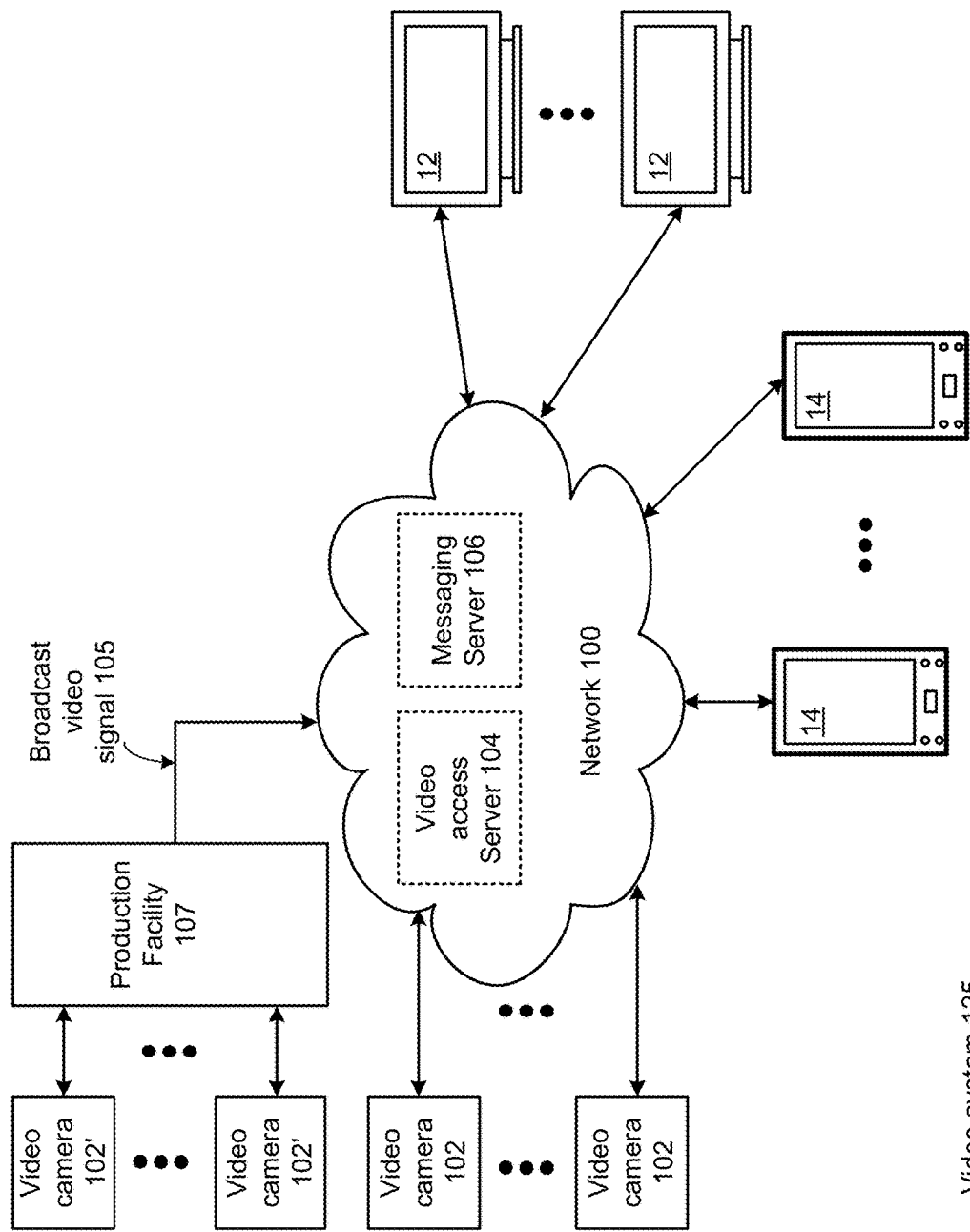

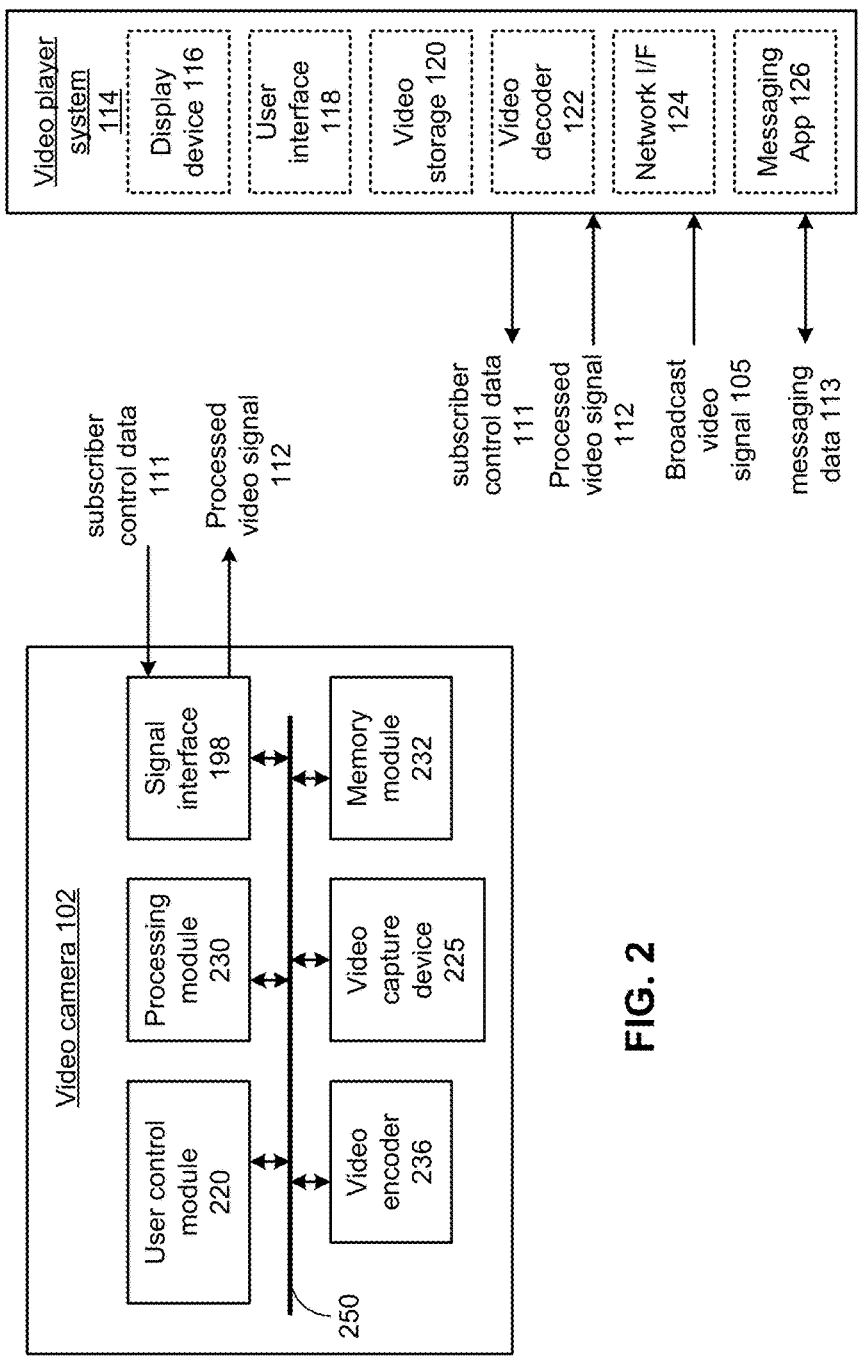

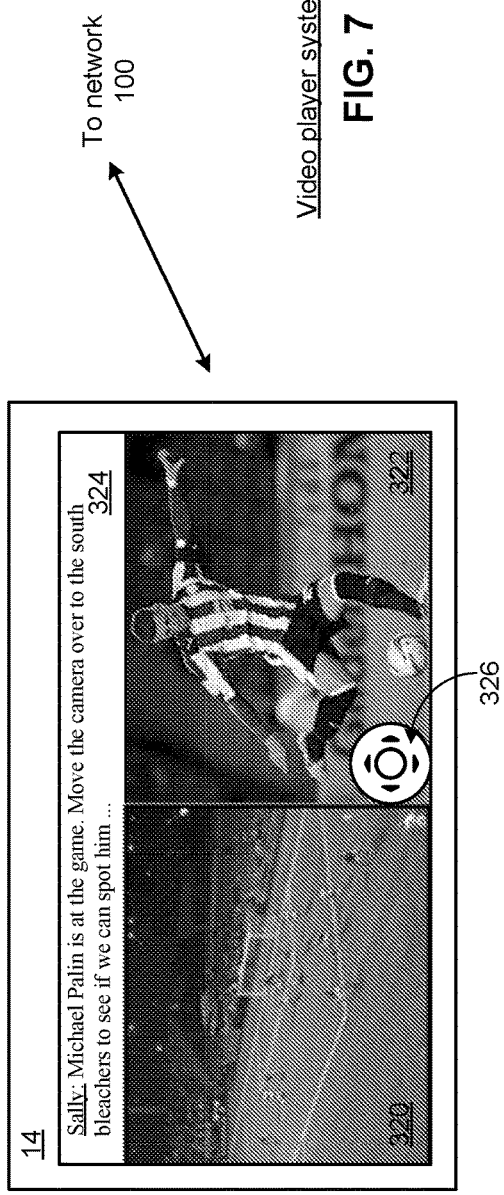
FIG. 7
FIG. 8
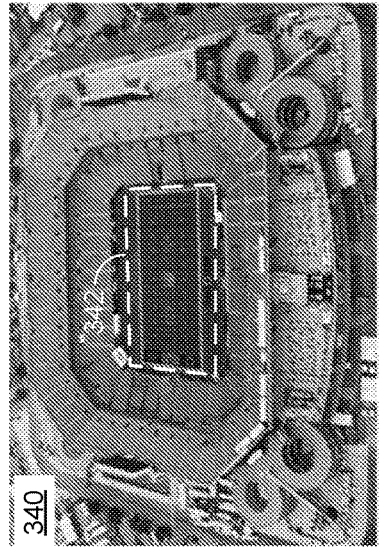
FIG. 9

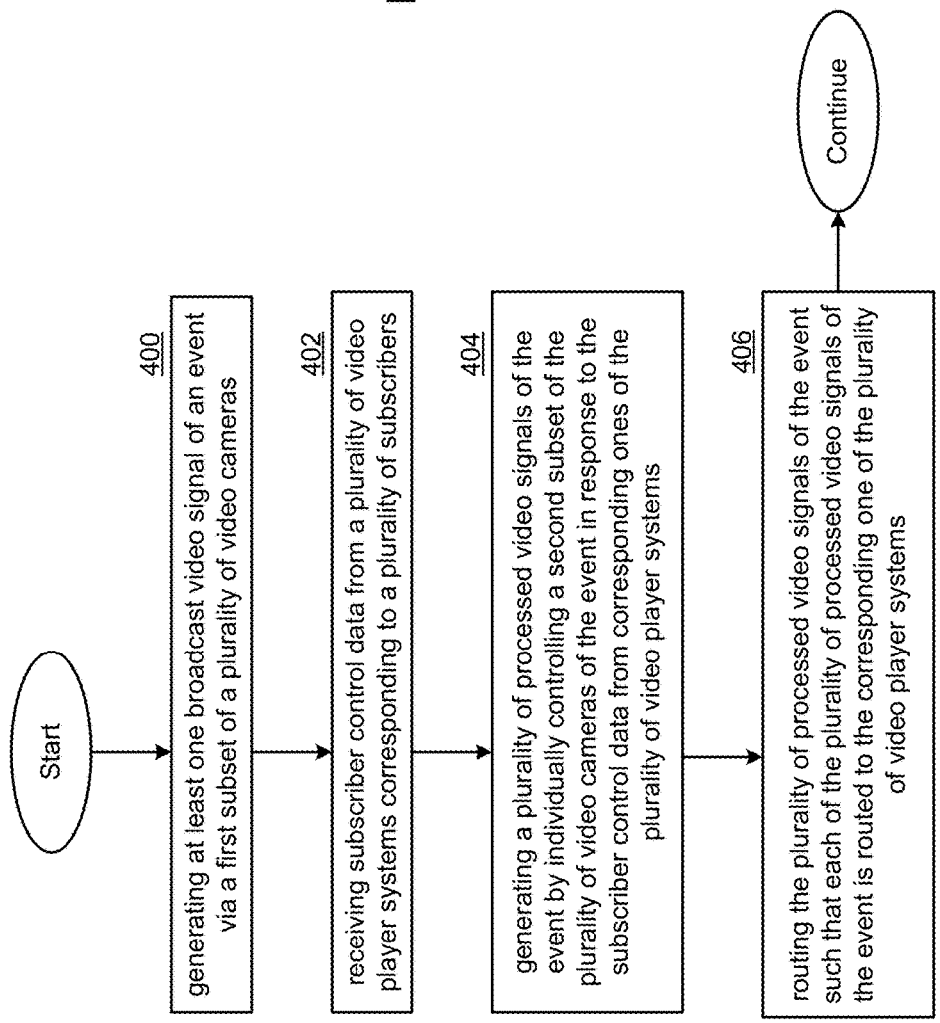

VIDEO CAMERA SYSTEM WITH DISTRIBUTED CONTROL AND METHODS FOR USE THEREWITH

TECHNICAL FIELD OF THE DISCLOSURE

The present disclosure relates to video camera systems that include video cameras for capturing a live event.

DESCRIPTION OF RELATED ART

Video cameras have become prevalent consumer goods. Not only do many consumers own a standalone video camera, but most consumers include own devices such as smartphones, laptop computers or tablets that include a video camera. Captured video can be encoded for transmission or storage.

Video systems use multiple video cameras for broadcasting an event. Feeds from individual cameras are selected for inclusion in a broadcast video feed. Viewers of the broadcast are limited by the particular camera shots included in the broadcast video feed. Further limitations and disadvantages of conventional and traditional approaches will become apparent to one of ordinary skill in the art through comparison of such systems with the present disclosure.

BRIEF DESCRIPTION OF THE SEVERAL VIEWS OF THE DRAWINGS

FIG. 1 presents a block diagram representation of a video camera system 125 in accordance with an embodiment of the present disclosure.

FIG. 2 presents a block diagram representation of a video camera 102 in accordance with an embodiment of the present disclosure.

FIG. 3 presents a block diagram representation of a video player system 114 in accordance with an embodiment of the present disclosure.

FIG. 7 presents a block diagram representation of a video player system 114 in accordance with a further embodiment of the present disclosure.

FIG. 8 presents a pictorial diagram representation of a camera drone 330 in accordance with a further embodiment of the present disclosure.

FIG. 9 presents a pictorial diagram representation of an event venue 340 in accordance with a further embodiment of the present disclosure.

FIG. 11 presents a flowchart representation of a method in accordance with an embodiment of the present disclosure.

Figure 4:
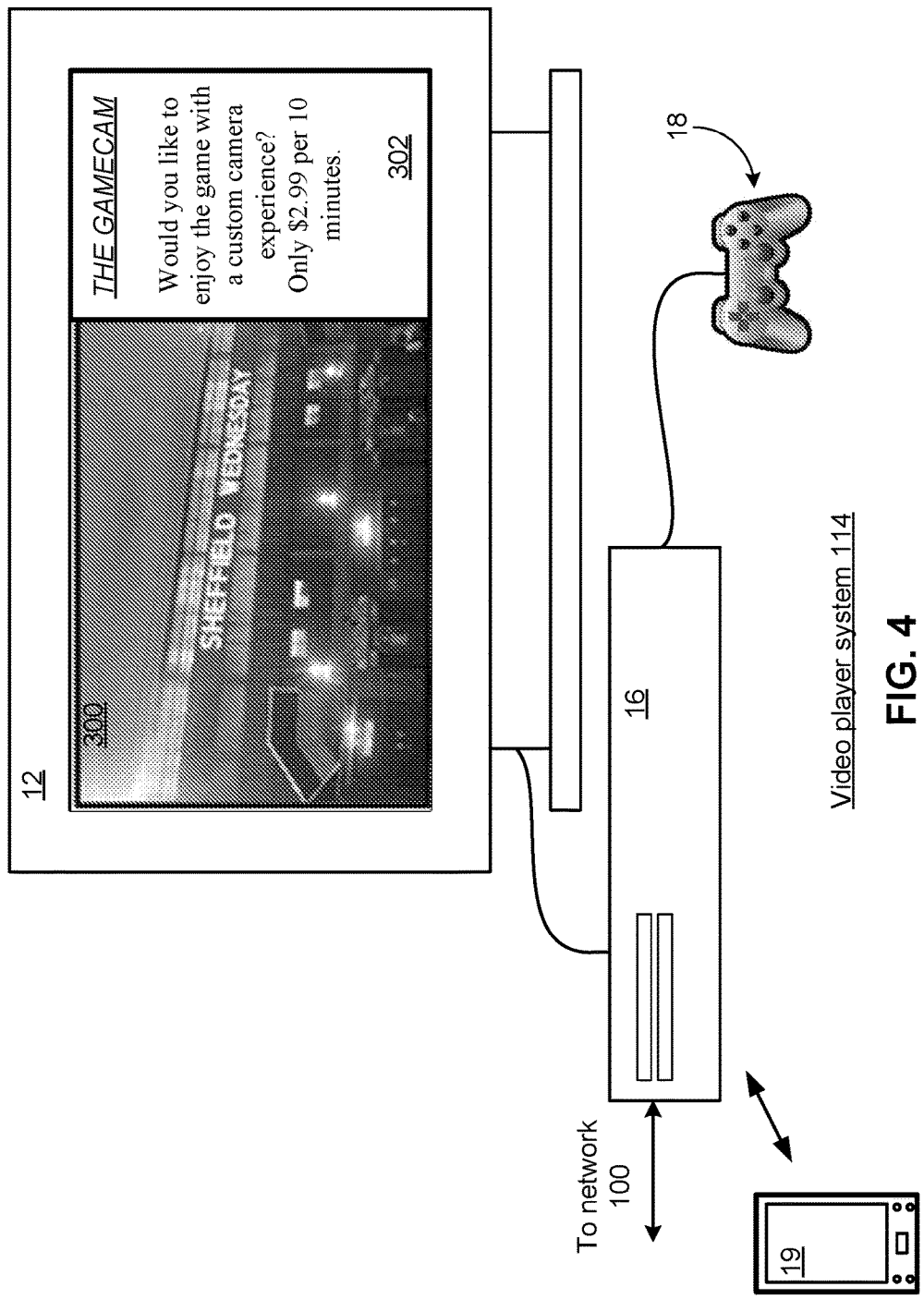
FIG. 4 presents a block diagram representation of a video player system 114 in accordance with a further embodiment of the present disclosure.

DETAILED DESCRIPTION OF THE DISCLOSURE INCLUDING THE PRESENTLY PREFERRED EMBODIMENTS

FIG. 1 presents a block diagram representation of a video camera system 125 in accordance with an embodiment of the present disclosure. In particular, a video system 125 is presented for capturing a live event such as a football game, soccer match, baseball game, basketball game or other sporting event, concert, religious service, conference or other live event. The video system includes a plurality of video cameras 102 and 102', a production facility 107 and a plurality of video player systems represented by video display devices 12 and mobile devices 14 that communicate via a network 100. While shown as a single network, the network 100 can include a wireless gateway for communicating with the video cameras 102, one or more local area networks, the Internet, a broadcast communication network such as a satellite, cable, telephone, cellular data or IP-based video distribution network as well as one or more other data networks either public or subscriber-based.

The video cameras 102' are configured to generate at least one broadcast video signal 105 of the event via production facility 107. The production facility 107 can be a production truck, a remote broadcast television studio or other production facility associated with the venue for the event. As is understood by one skilled in the art, the video cameras 102' can include standard and mobile broadcast cameras, a SkyCam or other robotic camera system, a camera drone or other video camera system.

In addition to the broadcast video signal 105, the live event is covered by many other video cameras 102. Individual subscribers are given control of one of the video cameras 102 and are sent the feed from that corresponding camera for viewing. In particular, the video cameras 102 are each individually controllable in response to subscriber control data from one of video player systems 12 or 14 to generate a corresponding one of a plurality of processed video signals of the event. In an embodiment, the video camera 102 include a camera drone or other video camera system that can be positioned and oriented in the event venue as well panned and zoomed in response to subscriber control data from an individual subscriber. The video access server 104 is configured to receive the subscriber control data from the plurality of video player systems 12 and 14 corresponding to a plurality of subscribers for control of the video cameras 102, and for routing the plurality of processed video signals of the event, such that the processed video signal of the event generated by the video camera controlled by an individual subscriber is routed to the video player system of that individual subscriber. In this fashion, a subscriber can control his or her "own" camera of the event to generate and receive a customized live video and/or audio feed that can be displayed in lieu of, or contemporaneously with, the broadcast video signal 105 of the event, such as in a tiled or split screen format.

In an embodiment, the subscriber control data from video player systems 12 or 14 includes a group identification signal that identifies at least one associated video player system that is authorized to view the subscriber's individual processed video signal of the event. In this case, the video access server 104 also routes the subscriber's individual processed video signal of the event to the associated video player system(s). In this fashion, the feed from the customized camera can be made available to a group defined by the user so that family and friends can access and enjoy the feed as well.

The messaging server 106 is configured to exchange messaging data between a subscriber's individual video player system 12 or 14 and any associated video player system 12 or 14. In this fashion, a user group can share text messages via the feed and communicate with one another, for example, "Dad—stop watching the cheerleaders and get back to the game" or "Let's follow the running back on the next play, I think he is going to score" or "Let's watch the field goal attempt from behind the uprights". In accordance with this embodiment, the video player systems 12 or 14 in the user group can be configured to display the processed video signal of the live feed contemporaneously with the messaging data. The messaging server can be implemented via a social media server as part of a social media site, a text messaging service that operates via the Internet and/or a 4G or high cellular data network, via a messaging server that is part of an Internet service or television service or other messaging server.

As previously discussed the video cameras 102 can each be a camera drone such as a mini drone that can be positioned and oriented in the event venue in response to subscriber control data from an individual subscriber. Each mini drone can have a camera that can be panned and/or zoomed in response to further subscriber control data from an individual subscriber. In this fashion, dozens or hundreds of such drones can capture the event on behalf of a like number of premium subscribers. In an embodiment, the video access server 104 monitors and limits the position of each of the plurality of camera drones to be within a restricted area of the event. In this fashion, positions too low to or otherwise too near a playing field, too near the proximity to fixed broadcast cameras, over or too near the crowd, or in areas that would impair the line of sight of spectators can be restricted to avoid drone operation in these restricted areas. It should be noted that the restricted areas can be modified during the event to conform with the progress of the event. For example, positional above the front of a stage of a concert can be restricted during period of time when pyrotechnics are used in this area. Areas near a goal post may be allowed for drone use during a football game—except during field goal attempts. The altitude limit for drones may be raised during punts, kick-offs and field goal attempts to avoid a drone's interference with an expected trajectory of the football. In addition, the video access server 104 further limits the position of each of the plurality of camera drones to avoid collision with others of the plurality of camera drones. In an embodiment, the video access server 104 tracks the position of each drone and assigns a safe zone in a radius around the drone so that other drones cannot travel in an area that might cause a collision.

In an embodiment, the video cameras 102 and 102' are in statically defined groups. In other embodiments however, the number of video cameras in the group is selected to correspond to a number of the plurality of subscribers. In this fashion, if not all of the drones are currently assigned to subscribers for individual control, the remaining drones can be reassigned to the group of video cameras 102' and controlled instead by the production facility 107 and used in generating the broadcast video signal 105.

While particular devices are shown, the video system 125 includes any device that is capable of generating processed video signals in accordance with the methods and systems described in conjunction with FIGS. 2-11 and the appended claims.

FIG. 2 presents a block diagram representation of a video camera 102 in accordance with an embodiment of the present disclosure. In particular, video camera 102 includes a signal interface 198, a user control module 220, a video capture device 225, a processing module 230, a memory module 232, and a video encoder 236.

The video capture device 225 includes a lens and digital image sensor such as a charge coupled device (CCD), complementary metal oxide semiconductor (CMOS) device or other image sensor that produces a high resolution video signal. As used herein, high resolution means resolution that is higher than a standard definition (SD) video signal. User control module 220 includes one or more flight controls or other actuated controls to control the position and/or orientation of the video camera such as in accordance with x, y, z, roll, pitch and yaw axes and further to control camera settings such as pan, zoom, flash or other lighting controls, focus, f-stop, image stabilization, filtering and other camera settings or controls in response to subscriber control data 111.

The video encoder 236 is configured to video encode a video signal such as a high resolution video signal to generate a processed video signal 112 that is formatted for output via the signal interface 198. The processed video signal 112 can be a digital video signal in a compressed digital video format such as h.264, MPEG-4 Part 10 Advanced Video Coding (AVC), high efficiency video coding (HEVC) or other digital format such as a Moving Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. The processed video signal 112 may be optionally encrypted, may include corresponding audio, and may be formatted for transport via one or more container formats. Examples of such container formats are encrypted Internet Protocol (IP) packets such as used in IP TV, Digital Transmission Content Protection (DTCP), etc. In this case the payload of IP packets contain several transport stream (TS) packets and the entire payload of the IP packet is encrypted. Other examples of container formats include encrypted TS streams used in Satellite/Cable Broadcast, etc. In these cases, the payload of TS packets contain packetized elementary stream (PES) packets. Further, digital video discs (DVDs) and Blu-Ray Discs (BDs) utilize PES streams where the payload of each PES packet is encrypted.

In an embodiment, the signal interface 198 includes one or more serial or digital signal interfaces to receive the subscriber control data 111 and to send the processed video signal 112. The signal interface 198 can include a wireless transceiver that operates via a wireless local area network protocol such as an IEEE 802.11 protocol, ZigBee protocol, 4G or higher cellular data protocol, or other wireless data protocol.

The processing module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 232. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230 and memory module 232 are coupled, via bus 250, to the signal interface 198, video capture device 225, video encoder 236 and user control module 220. In an embodiment of the present disclosure, the signal interface 198, video capture device 225, encoder device 236 and user control module 220 each operate in conjunction with the processing module 230 and memory module 232. The modules of video camera 102 can each be implemented in software, firmware or hardware, depending on the particular implementation of processing module 230. It should also be noted that the software implementations of the present disclosure can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present disclosure.

FIG. 3 presents a block diagram representation of a video player system 114 in accordance with an embodiment of the present disclosure. In particular, a video system is presented that provides a further implementation of video player systems 12 or 14 presented in conjunction with FIG. 1. The video player system 114 includes a display device 116 such as a liquid crystal display (LCD), light emitting diode (LED) or other display device. The messaging app 126 operates to send, receive, create and display message data representing incoming and outgoing messages. The user interface 118 operates under the control of the user of the video player system 114 to generate signals to control the video player system 114 in response to the user commands and further to generate subscriber control data 111.

The network interface 124 communicates via one or more networks 100 to receive the broadcast video signal 105 and the processed video signal 112, send the subscriber control data 111 and bidirectionally communicate messaging data 113. The video player system 114 also includes a video storage 120 such as a memory device and a video decoder 122 that decodes the processed video signal 112 for display by the display device 116.

Further examples of the operation of video player 114 including several optional functions and features are presented in conjunctions with FIGS. 4-7 that follow.

FIG. 4 presents a block diagram representation of a video player system 114 in accordance with a further embodiment of the present disclosure. In particular, a video system 114 is shown that includes a set-top box 16 that is coupled to television 12 and remote control device 18 and to network 100. In this embodiment, the network 100 is a broadcast cable and IP network or an IP based television network. In operation, the set top box 16 receives and displays a broadcast video signal of a soccer match as screen display 300.

As shown, a prompt 302 is presented to the user to subscribe to a custom camera experience on a fee-basis that is charged based on the number of minutes used. The user can generate subscriber control data via the interaction with the remote control 18 or a television remote not specifically shown, to accept the subscription. In the alternative, a smartphone or tablet 19 runs a remote control application and is coupled via Bluetooth, 802.11 or other wireless connection to the set top box 16 or television 12 to generate user interface data to accept the subscription.

Figure 5:
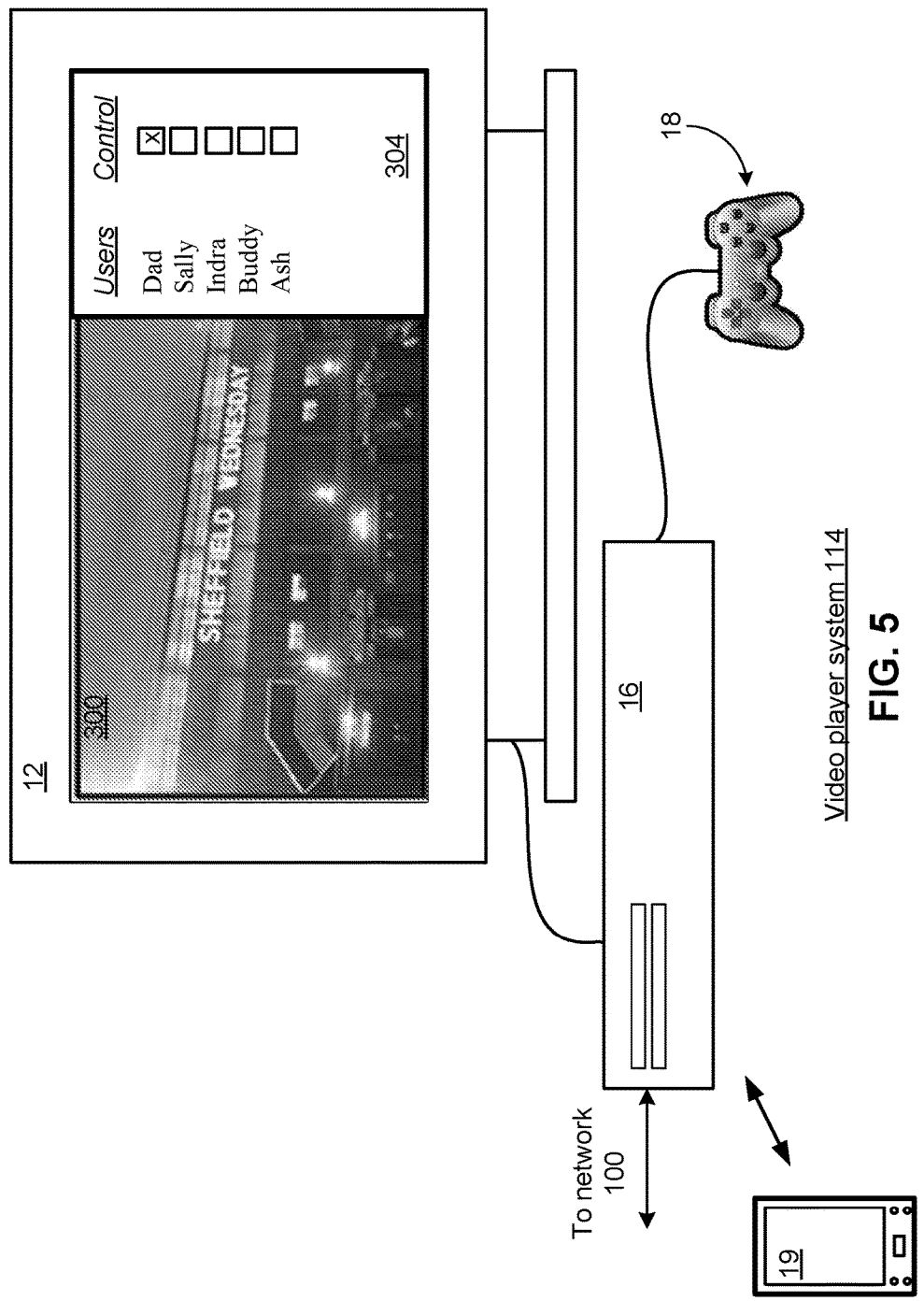
FIG. 5 presents a block diagram representation of a video player system 114 in accordance with a further embodiment of the present disclosure.

FIG. 5 presents a block diagram representation of a video player system 114 in accordance with a further embodiment of the present disclosure. In particular, a video player system 114 is shown that follows along with the example of FIG. 4.

In this case, the user has opted to subscribe to the custom camera experience and is selecting the group of users via a prompt 304 to receive the custom video feed, and has selected a particular user to initially control the feed. While not specifically shown, the users have associated network addresses so that the video access server 104 of FIG. 1 can route the custom video feed to devices associated with each user in the group. Further, while the subscriber has selected the user that will initially control the feed, the subscriber can optionally update this information during the event to pass the control of the video camera to different users within the user group.

As previously discussed, the members of the user group can share text messages via the feed and communicate with one another. In accordance with this embodiment, the members of user group can be associated with messaging addresses for their corresponding video player systems 114 such as devices 12 or 14 so that messages can be sent and received.

Figure 6:
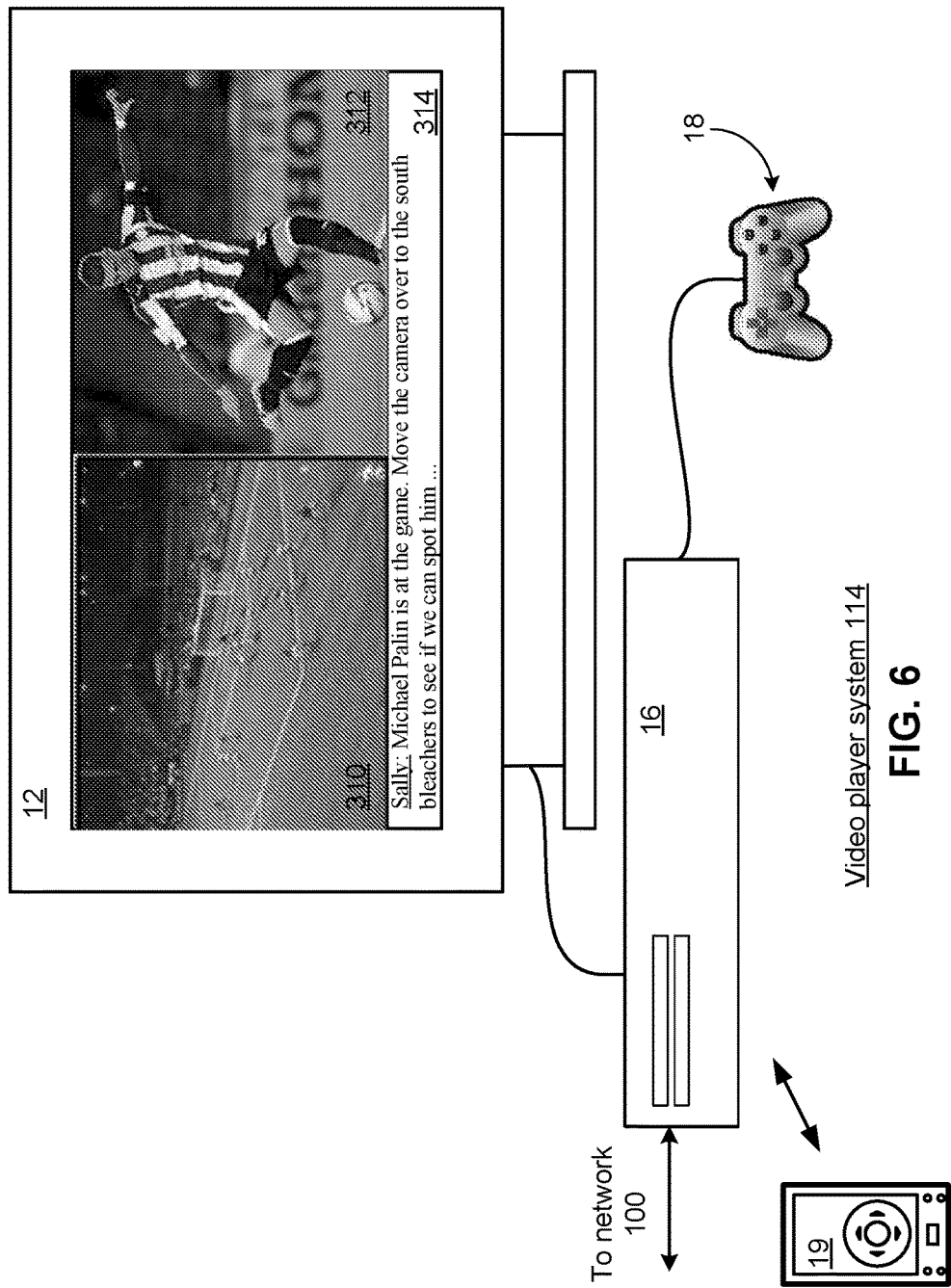
FIG. 6 presents a block diagram representation of a video player system 114 in accordance with a further embodiment of the present disclosure.

FIG. 6 presents a block diagram representation of a video player system 114 in accordance with a further embodiment of the present disclosure. In particular, a video system 114 is shown that follows along with the example of FIGS. 4 and 5. In this case, the broadcast video signal is displayed in region 310 and the processed video signal from the custom controlled camera is displayed in region 312. In this embodiment, the remote control device 18 generates subscriber control data 111 that is sent via network 100 to control the operation of the video camera 102 under custom control. In the alternative, the smartphone or tablet 19 runs the remote control application to generate subscriber control data 111. In either fashion, the user can control the position and/or orientation of the camera as well as other camera functions to select a desirable shot.

As shown, group messages associated with the user group are displayed in region 314 of the display. The remote control device 18 or other remote control device can be used to generate messages locally to be shared with the group. In the alternative, the smartphone or tablet 19 runs the remote control application to generate messages locally to be shared with the group.

FIG. 7 presents a block diagram representation of a video player system 114 in accordance with a further embodiment of the present disclosure. In particular, a video player system 114 is shown that follows along with the example of FIGS. 4 and 5. In this case however, the video player system 114 is implemented via a smartphone or tablet 14.

The broadcast video signal is displayed in region 320 and the processed video signal from the custom controlled camera is displayed in region 322. In this embodiment, a virtual joystick touch screen region 326 is used to generate subscriber control data 111 that is sent via network 100 to control the operation of the video camera 102 under custom control. As shown, group messages associated with the user group are displayed in region 324 of the display.

FIG. 8 presents a pictorial diagram representation of a camera drone 330 in accordance with a further embodiment of the present disclosure. In particular a camera drone 330 is shown as a Brava 500 that is used to implement any of the video cameras 102 or 102', however any of a number of other camera drones can be employed for this purpose. The camera drone 330 can be positioned and oriented at the event venue in response to subscriber control data from an individual subscriber. The camera drone 330 includes a camera 332 that can be panned and zoomed in response to further subscriber control data from an individual subscriber.

FIG. 9 presents a pictorial diagram representation of an event venue 340 in accordance with a further embodiment of the present disclosure. As previously discussed the video access server 104 can monitor and limit the position of each of the plurality of camera drones to be within a restricted area of the event. The event venue 340 is shown as a football stadium that includes a boundary of a restricted area 342 for drone flight. In the example shown, the boundary corresponds to an area over the playing field to avoid being over the crowd. While shown as a two dimensional boundary, the restricted area 342 can be defined by a three-dimensional boundary that also restricts positions that are too low or too high.

While shown as a static region, the restricted area 342 can change as a function of time. In particular, the restricted area 342 can be modified during a football game to conform with the progress of the event. For example, areas near a goal post may be allowed for drone use during a football game—except during field goal attempts. The altitude limit for drones may be raised during punts, kick-offs and field goal attempt to avoid a drone's interference with an expected trajectory of the football, etc. The restricted area can be relaxed during time-outs during a game or other times that play or other event activities are paused.

Figure 10:
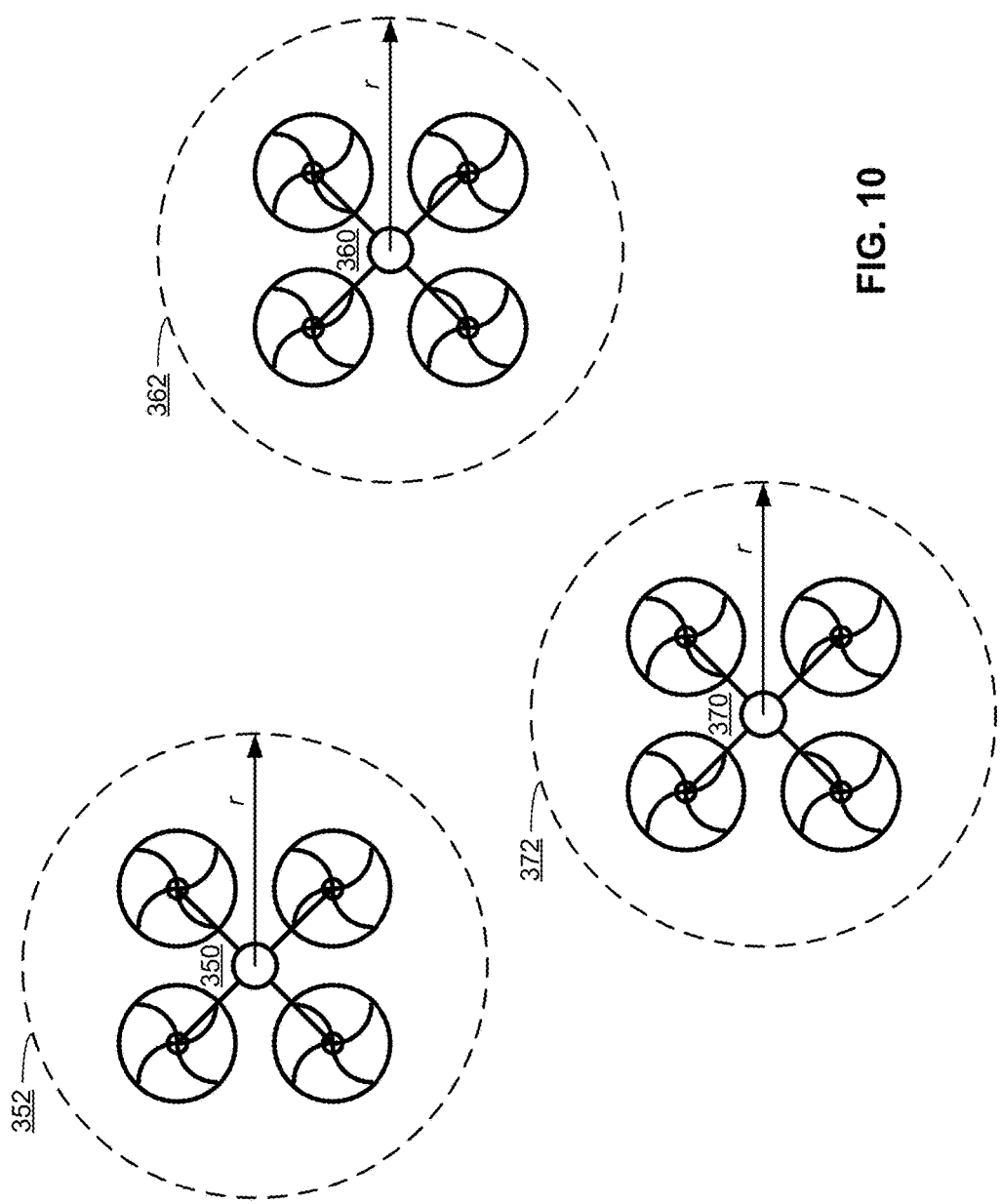
FIG. 10 presents a block diagram representation of a plurality of camera drones 350, 360 and 370 in accordance with a further embodiment of the present disclosure.

FIG. 10 presents a block diagram representation of a plurality of camera drones 350, 360 and 370 in accordance with a further embodiment of the present disclosure. As previously discussed, the video access server 104 limits the position of each of the plurality of camera drones to avoid collision with others of the plurality of camera drones. In the example shown, the video access server 104 tracks the position of each drone 350, 360 and 370 and assigns safe zones 352, 362 and 372, with a radius r, around each drone so that other drones cannot travel in an area that might cause a collision.

FIG. 11 presents a flowchart representation of a method in accordance with an embodiment of the present disclosure. In particular, a method is presented for use in conjunction with one or more functions and features presented in association with FIGS. 1-10. Step 400 includes generating at least one broadcast video signal of an event via a first subset of a plurality of video cameras. Step 402 includes receiving subscriber control data from a plurality of video player systems corresponding to a plurality of subscribers. Step 404 includes generating a plurality of processed video signals of the event by individually controlling a second subset of the plurality of video cameras of the event in response to the subscriber control data from corresponding ones of the plurality of video player systems. Step 406 includes routing the plurality of processed video signals of the event such that each of the plurality of processed video signals of the event is routed to the corresponding one of the plurality of video player systems.

In an embodiment, each of the plurality of video player systems are configured to display the corresponding one of the plurality of processed video signals of the event contemporaneously with the broadcast video signal of the event. The subscriber control data from the corresponding one of the plurality video player systems can include a group identification signal that identifies at least one associated video player system that is authorized to view the corresponding one of the plurality of processed video signals of the event. In this case the method can further include the step of routing the corresponding one of the plurality of processed video signals of the event to the at least one associated video player system.

In an embodiment, the method further includes communicating messaging data between the corresponding one of the plurality of the plurality video player systems and the at least one associated video player system. The corresponding one of the plurality of video player systems can be configured to display the corresponding one of the plurality of processed video signals of the event contemporaneously with the messaging data.

In an embodiment, the second subset of video cameras includes a plurality of camera drones. Each of the camera drones can be individually controllable in response to the subscriber data from the corresponding one of the plurality of video player systems. In this case, the method can include limiting a position of each of the plurality of camera drones to be within a restricted area of the event and to avoid collision with others of the plurality of camera drones. The number of video cameras in the second subset can be selected to correspond to the number of the plurality of subscribers.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:
1. A video camera system comprising:
a plurality of video cameras including a first subset of video cameras that are configured to generate at least one broadcast video signal of an event, and wherein the plurality of video cameras include a second subset of video cameras that are each individually controllable by a corresponding one of a plurality of subscribers of the video camera system via subscriber control data from a corresponding one of a plurality of video player systems to generate a corresponding one of a plurality of processed video signals of the event; and a video access server configured to receive the subscriber control data from the plurality of video player systems corresponding to a plurality of subscribers for control of the second subset of video cameras, and for routing the plurality of processed video signals of the event such that the corresponding one of the plurality of processed video signals of the event is routed to the corresponding one of the plurality of video player systems;

wherein the second subset of video cameras includes a plurality of camera drones, wherein each of the plurality of camera drones is individually controllable in response to the subscriber control data from the corresponding one of the plurality of video player systems, and wherein the video access server limits a position of each of the plurality of camera drones to be within a restricted area of the event.

2. The video camera system of claim 1 wherein each of the plurality of video player systems are configured to display the corresponding one of the plurality of processed video signals of the event contemporaneously with the broadcast video signal of the event.

3. The video camera system of claim 1 wherein the subscriber control data from the corresponding one of the plurality video player systems includes a group identification signal that identifies at least one associated video player system that is authorized to view the corresponding one of the plurality of processed video signals of the event, and wherein the video access server further routes the corresponding one of the plurality of processed video signals of the event to the at least one associated video player system.

4. The video camera system of claim 3 further comprising:
a messaging server configured to exchange messaging data between the corresponding one of the plurality video player systems and the at least one associated video player system.

5. The video camera system of claim 4 wherein the corresponding one of the plurality of video player systems is configured to display the corresponding one of the plurality of processed video signals of the event contemporaneously with the messaging data.

6. The video camera system of claim 1 wherein the video access server further limits the position of each of the plurality of camera drones to avoid collision with others of the plurality of camera drones.

7. The video camera system of claim 1 wherein a number of video cameras in the second subset of video cameras is selected to correspond to a number of the plurality of sub scribers.

8. A method comprising:
generating at least one broadcast video signal of an event via a first subset of a plurality of video cameras;
receiving subscriber control data from a plurality of video player systems corresponding to a plurality of subscribers;
generating a plurality of processed video signals of the event by individually controlling a second subset of the plurality of video cameras of the event in response to the subscriber control data from corresponding ones of the plurality of video player systems, wherein the second subset of the plurality of video cameras includes a plurality of camera drones, wherein each of the plurality of camera drones is individually controllable in response to the subscriber control data from the corresponding one of the plurality of video player systems;

limiting a position of each of the plurality of camera drones to be within a restricted area of the event and to avoid collision with others of the plurality of camera drones; and routing the plurality of processed video signals of the event such that each of the plurality of processed video signals of the event is routed to the corresponding one of the plurality of video player systems.

9. The method of claim 8 wherein each of the plurality of video player systems are configured to display a corresponding one of the plurality of processed video signals of the event contemporaneously with the broadcast video signal of the event.

10. The method of claim 8 wherein the subscriber control data from the corresponding one of the plurality video player systems includes a group identification signal that identifies at least one associated video player system that is authorized to view a corresponding one of the plurality of processed video signals of the event, and wherein the method further comprises:
routing the corresponding one of the plurality of processed video signals of the event to the at least one associated video player system.

11. The method of claim 10 further comprising:
communicating messaging data between the corresponding one of the plurality of the plurality video player systems and the at least one associated video player system.

12. The method of claim 11 wherein the corresponding one of the plurality of video player systems is configured to display the corresponding one of the plurality of processed video signals of the event contemporaneously with the messaging data.

13. The method of claim 8 wherein a number of video cameras in the second subset of the plurality of video cameras is selected to correspond to a number of the plurality of sub scribers.

14. The video camera system of claim 1 wherein each of the second subset of video cameras is at least one of: positioned, oriented, panned, or zoomed in response to the subscriber control data from the corresponding one of the plurality of video player systems.

15. The method of claim 8 wherein each of the second subset of the plurality of video cameras is at least one of: positioned, oriented, panned, or zoomed in response to the subscriber control data from the corresponding one of the plurality of video player systems.

16. The method of claim 8 further comprising:
limiting the position of each of the plurality of camera drones to avoid collision with others of the plurality of camera drones.

* * * * *